United States Patent [19]

Stahlecker et al.

[11] E Re. 30,201

[45] Reissued Feb. 5, 1980

[54] METHOD AND APPARATUS FOR START-SPINNING A THREAD ON AN OPEN-END SPINNING UNIT OF AN OPEN-END SPINNING MACHINE

[76] Inventors: Fritz Stahlecker, Josef-Neidhart-Strasse 18, D-7341 Bad Uberkingen; Hans Stahlecker, Haldenstrasse 20, D-7334 Suessen, both of Fed. Rep. of Germany

[21] Appl. No.: 934,009

[22] Filed: Aug. 16, 1978

Related U.S. Patent Documents

Reissue of:

[64] Patent No.: 3,987,610
Issued: Oct. 26, 1976
Appl. No.: 528,471
Filed: Nov. 29, 1974

[30] Foreign Application Priority Data

Dec. 4, 1973 [DE] Fed. Rep. of Germany ..... 2360296
Aug. 6, 1974 [DE] Fed. Rep. of Germany ..... 2437762

[51] Int. Cl.[2] ..... D01H 1/12; D01H 1/34; D01H 15/00

[52] U.S. Cl. ..... 57/263; 57/58.89; 57/80

[58] Field of Search ..... 57/58.89–58.95, 57/263, 78, 80, 81, 83, 92, 93

[56] References Cited

U.S. PATENT DOCUMENTS

| | | | |
|---|---|---|---|
| 3,704,579 | 12/1972 | Tooka et al. | 57/263 |
| 3,780,513 | 12/1973 | Watanabe et al. | 57/263 X |
| 3,791,128 | 2/1974 | Landwehrkamp et al. | 57/58.89 X |
| 3,810,352 | 5/1974 | Miyazaki et al. | 57/263 |
| 3,842,579 | 10/1974 | Bartling | 57/263 |
| 3,879,926 | 4/1975 | Bartling et al. | 57/263 X |
| 4,020,621 | 5/1977 | Tsubata | 57/263 |

*Primary Examiner*—Donald Watkins
*Attorney, Agent, or Firm*—Craig and Antonelli

[57] ABSTRACT

In order to be able to start-spin on the individual spinning units of an open-end spinning machine under conditions which deviate from the operating conditions and which are, in particular, significantly more favorable for start-spinning, the end of the thread is placed on a ring of fibres located in the spinning rotor at a spinning rotor speed which is reduced relative to the operating speed. At the same time, the sliver feed is reduced in such a manner that the amount of sliver feed corresponds to the reduced speed of the spinning rotor. This reduced sliver speed is produced by a mobile start-spinning unit which is equipped with means which intervene in the drive and/or control of the drive or control means causing feed of the sliver.

15 Claims, 10 Drawing Figures

METHOD AND APPARATUS FOR START-SPINNING A THREAD ON AN OPEN-END SPINNING UNIT OF AN OPEN-END SPINNING MACHINE

Matter enclosed in heavy brackets [ ] appears in the original patent but forms no part of this reissue specification; matter printed in italics indicates the additions made by reissue.

The present invention relates to a method for start-spinning a thread on open-end spinning units of an open-end spinning machine, in which an end of the thread is returned to a spinning rotor, placed on a ring of fibres deposited in the spinning rotor and then drawn off again.

It is the object of the present invention to permit neat start-spinning of a thread which is largely independent of the technological conditions of the open-end spinning unit in the operating condition. It is a further object of the invention to achieve the technological conditions for start spinning independently of the operating condition, without necessitating excessive design and manufacturing effort, whereby, primarily, the sliver feed for the start-spinning operation can be designed in such a manner that it corresponds to the speed of the spinning rotor during the start-spinning operation.

According to the present invention, this object is solved in that during the placing of the end of the thread on the ring of fibres, the speed of the spinning rotor is reduced relative to its operating speed and in that a mobile start-spinning unit intervenes in the drive and/or control means providing the sliver feed and thus controlling the volume of the ring of fibres deposited in the spinning rotor.

This permits the design changes on the individual spinning units to be limited to providing a possibility of intervention for the start-spinning unit. No other significant changes must be made to the usual drive of the unit for feeding the sliver. The additional constructional effort is therefore minimal, thereby permitting the manufacturing costs to be kept low. In an advantageous further development of the invention, for performing the method the start-spinning unit has an auxiliary drive for the sliver feed, which can be coupled with the switched off drive during the start-spinning operation. By means of this apparatus, it is possible, in a simple manner, to meter the sliver feed in such a manner that there is a suitable fiber ring in the spinning rotor when the end of the tread is placed thereon. This utilizes the fact that, normally, during a thread break or similar event the feed means of the corresponding open-end spinning unit are practically always interrupted, so that it is merely necessary to also provide that this drive remains shut off until after the start-spinning operation has been performed.

In another embodiment of the invention, the start-spinning unit contains intermittently operating switching means which can be connected with the switching means of a clutch which is associated to the sliver feed and which can be switched on and off. This also requires hardly any increased effort, as those elements of the spinning units are generally employed which always have to be present. Here, also, it is possible to control the starting characteristic of the sliver feed in a simple manner by switching it on and off, so that there is a suitable ring of fibres in the spinning rotor on which to place the end of the thread, thus providing a perfect start-spinning point.

In a further embodiment of an apparatus according to the present invention, the start-spinning unit contains an auxiliary brake which can be coupled with the means for feeding the sliver. This apparatus also requires only very simple modification of the means in the open-end spinning units for feeding the sliver, while the special design of the start-spinning unit can be kept very simple. There is no difficulty in creating a low-wearing auxiliary brake, which ensures the desired starting characteristic.

In order, in a further development of the invention, to create an apparatus which operates with very precise timing and with only a limited degree of time lag, the start-spinning unit contains intermittently operating control means which intervene directly from the outside in trapping means which interrupt the silver feed and which interrupt the trapping effect thereof intermittently. Since the switching means intervene directly in the trapping means, the sliver feed is switched on and off alternately without any delay for all practical purposes.

The above discussed and other objects, features and advantages of the present invention will become more apparent from the following description thereof, when taken in connection with the accompanying drawings, in which FIG. 1 shows a graphic representation of the starting sequence of a spinning unit with the start-spinning operation indicated therein;

Figure 1:
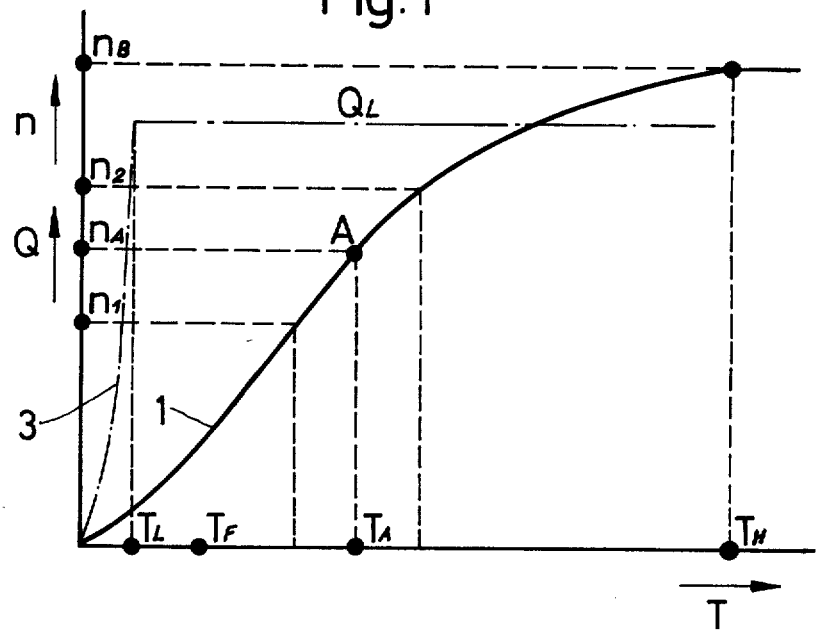

Referring now to the drawings, wherein like reference numerals designate like parts throughout the several views, FIG. 1 shows the spread n of a spinning rotor during time T, in the form of a curve 1, during a starting sequence. The spinning rotor, starting from a standstill, reaches the operating speed, $n_B$ at the moment $T_H$. It has been shown that a favourable speed range, in which the start-spinning operation can be performed most reliably, is located between speeds $n_1$ $nn_2$, for example. Within this range, it is possible to stipulate a start-spinning point A on curve 1, which then also includes start-spinning time $T_A$ and start-spinning speed $n_A$, which is clearly slower than operating speed $n_B$.

To perform start-spinning at point A, the end of the thread must be returned prior to start-spinning time $T_A$, for example at time $T_F$, indicated on the abscissa, in order for the end of the thread to reach the ring of fibres deposited in the spinning rotor at time $T_A$, whereupon draw-off of the thread is initiated.

The dash-dotted curve 3 also contained in FIG. 1 represents the course of sliver feed Q through time T. As can be seen from this curve 3, after only a short time the sliver feed attains its maximum value $Q_L$ at time $T_L$. The period of time required therefor is considerably shorter than the period of time required for the starting sequence of the spinning rotor.

Curves 1 and 3 in FIG. 1 show clearly that at start-spinning time $T_A$ the fibre feed is greater than that required by operating conditions, which must result in a change in the quality of the yarn at the start-spinning point. For this reason, measures must be taken to ensure a suitable ratio between the fibre feed at start-spinning time $T_A$ and the reduced start-spinning speed $n_A$ of the spinning rotor. This is possible, for example, in that the fibre feed is initiated with a delay, so that time $T_L$, at which the operating feed quality $Q_L$ is attained, is after start-spinning time $T_4$. Because of the steepness of curve 3, the switch-on and start-spinning must be performed at precisely stipulated moments, as the sliver feed conditions change very rapidly. In order to provide a longer period of time for the start-spinning operation, it is therefore advantageous to provide aids through which steepness of curve 3 can be reduced, permitting operating feed $Q_L$ to be attained later.

Figure 2:
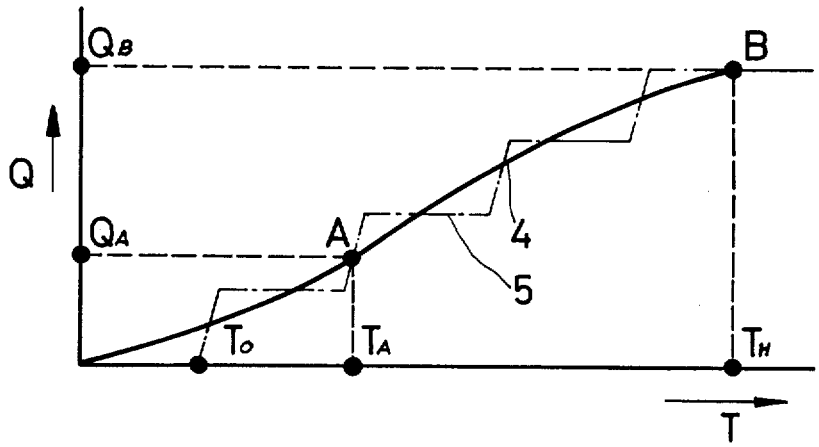
FIG. 2 shows a graphic representation of a reduced sliver feed during the starting sequence of a spinning unit.

It would be favourable for the start-spinning operation if curve 3 were influenced in such a manner that it had the same steepness as curve 1. A curve 4 of this type is illustrated in FIG. 2, which shows feed Q over time T. A curve 4 of this type for the starting sequence of the feed can be realized with the present invention.

In many cases, it is sufficient for curve 4 to only be approximated, for example through a curve 5, shown as a dash-dotted line in FIG. 2. The latter possibility is described in detail in the invention of the main patent application and can be realized by delayed switch-on of the sliver feed at time $T_0$, followed by repeatedly switching off the drive briefly.

Figure 3:
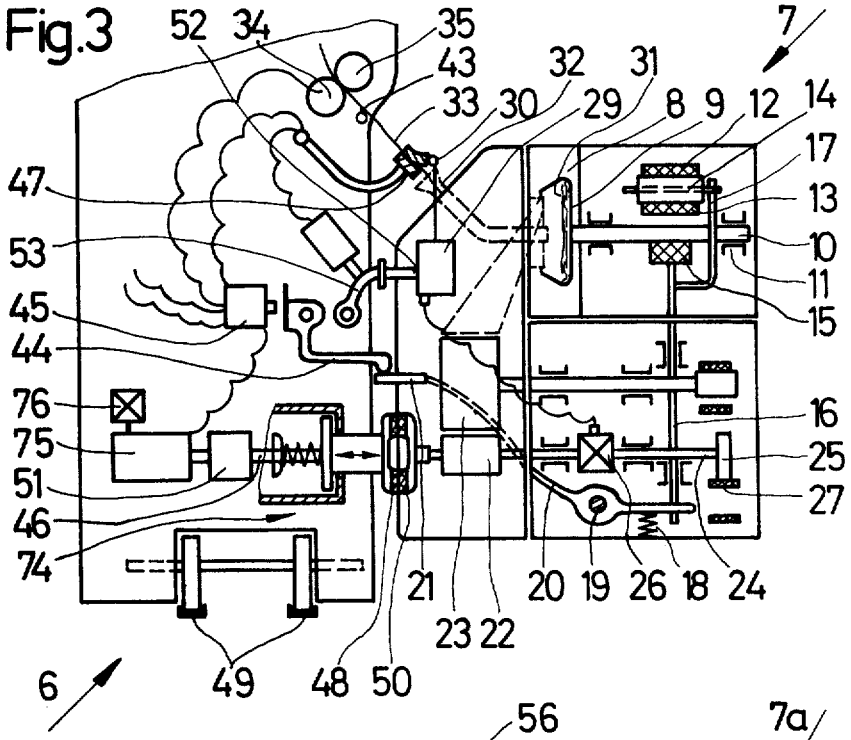
FIG. 3 shows an apparatus for performing the method according to the invention, containing an auxiliary drive.

With the embodiment according to FIG. 3, both curve 4 as well as curve 5 in FIG. 2 can be realized when the sliver feed is started. Provided in the embodiment shown in FIG. 3 is a start-spinning unit 6, which travels on rails 49 along an open-end spinning machine, of which only one spinning point 7 is illustrated schematically as a cross section. Rotating in an underpressure chamber 8 is a spinning rotor 9, whose shaft 10 is mounted in bearings 11 in a housing located therebehind. Shaft 10 is driven by means of a tangential belt, whose bottom track 13 is pressed against the shaft by a pressure roller 14 in the operational condition, while the upper track 12 returns over pressure roller 14. In the illustrated brake condition, pressure roller 14 is lifted away from rotor shaft 10 together with the lower track 13 of the tangential belt, whereby rotor shaft 10 is braked with a brake 15. Brake 15 has an actuating rod 16, which is coupled with a lift-off mechanism 17 for pressure roller 14. Actuating rod 16 of brake 15 can be adjusted by means of a double lever 20, which is pivotally mounted about an axle 19. A tension spring 18 acts on double lever 20, said tension spring 18 pulling it into a position which releases rotor shaft 10. The free arm 21 of double lever 20 extends out of spinning unit 7 to the front.

Fibres are supplied to spinning rotor 9 in a separated state. To accomplish this, a sliver is caught by a feed roller 22 and advanced to a separating roller 23, from where the separated fibres reach spinning rotor 9. Feed roller 22 is connected to a toothed belt 27, extending in the longitudinal direction of the machine, by means of a shaft 24 and a gear 25. The connection between gear 25 and feed roller 22 can be interrupted by means of a solenoid clutch 26, which divides shaft 24. Clutch 26 is electrically connected with a switch 29 of a thread stop-motion 30, which switches off clutch 26 in the event of a thread break.

Start-spinning unit 6, which is only illustrated schematically, picks up a thread end 33 from an unillustrated winding cone and returns it to the spinning rotor through a yarn removal channel 32, whereby it is placed on a ring of fibres 31 in the spinning rotor. The thread end 33 is returned by means of auxiliary draw-off rollers 34 and 35 of start-spinning unit 6, of which at least roller 34 can be driven in either sense of rotation. The thread end is sucked into spinning rotor 9 by means of the suction in underpressure chamber 8. The reversal of the sense of rotation of auxiliary draw-off roller 34 is controlled by means of a thread tension feeler 43 of start-spinning unit 6.

In order to be able to start spinning at a rotor speed which is lower than the operating speed, the start-spinning operation is performed during the starting sequence of spinning rotor 9. To accomplish this, start-spinning unit 6 has an actuating lever 44, which is located opposite the free lever arm 21 of double lever 20 of brake 15 when start-spinning unit 6 is aligned precisely with the respective spinning unit 7. When free arm 21 of brake 15 is released, which can be controlled automatically, actuating lever 44 is actuated and, in turn, actuates a starting switch 45, which has a time-lag relay. Starting switch 45 is connected with a drive motor of auxiliary draw-off rollers 34 and 35 for performing the start-spinning operation, on the one hand, and with an auxiliary drive, on the other, through which feed roller 22 is driven in such a manner that its starting characteristic, and thus feed of the sliver, corresponds at least approximately to the starting characteristic of the spinning rotor.

In the illustrated embodiment, the auxiliary drive of start-spinning unit 6 has an electric variable-speed motor 75, whose runup can be adjusted by means of a controlling element 76. A wound-rotor motor with appropriate rheostatic starting circuitry or a d.c. motor whose runup can be otherwise controlled can be provided for this purpose. Variable-speed motor 75 drives a shaft 46, which is connected with a driving wheel 48. Shaft 46 and driving wheel 48 are connected via adjusting means 74, which permit driving wheel 48 to be shifted axially. Arranged opposite driving wheel 48 is a counterwheel 50, which is rigidly connected with feed roller 22 and which is accessible from the outside. A gear or friction clutch can be located between driving wheel 48 and counterwheel 50.

Since the sliver feed is driven by means of the auxiliary drive of start-spinning unit 6 during the start-spinning operation, the main drive of the sliver feed must remain off during this period, whereby clutch 26 remains open. This can be controlled by means of an electrical timing element, for example, which only closes clutch 26 after a delay, even if thread stop-motion 30 has been placed in its operating position again, which, in the illustrated embodiment, is performed by means of a thread trapper 47 of start-spinning unit 6, which offers the thread end to the opening of the yarn removal channel 32. In this embodiment, it can be ensured, with the aid of additional switching means of start-spinning unit 6, that clutch 26 remains open, so that here, also, the sophistication of the individual spinning units 7 remains small. For this purpose, switch 29 of thread stop-motion 30 is designed as a double switch, which can also be switched by a pusher 52 in such a manner that clutch 26 remains open. The pusher is reversed by means of a lever 53 of start-spinning unit 6 associated to it, said lever 53 being switched with the aid of an electric servo element. This servo element, and thus lever 53, can be coupled electrically with thread trapper 47, so that swivelling thread stop-motion 30 into its operating position with the aid of thread trapper 47 results in actuation of pusher 52, so that clutch 26 remains open. After the start-spinning operation, clutch 26 is closed, thereby starting the main drive of the sliver feed. In order to avoid mutual damage to the auxiliary drive and the main drive, free-wheeling means are installed in the auxiliary drive. This also ensures that the transition of the sliver feed from the auxiliary drive to the main drive is uniform and smooth.

It is also possible to actuate the servo element of lever 53 with a timing programme in such a manner as to switch the main drive of feed roller 22 on and off intermittently, which results in a starting-sequence characteristic according to curve 5 in FIG. 2. This permits the runup characteristic of the sliver feed to be adapted to the runup characteristic of the spinning rotor in the desired manner, without the employment of an auxiliary drive.

Figure 4:
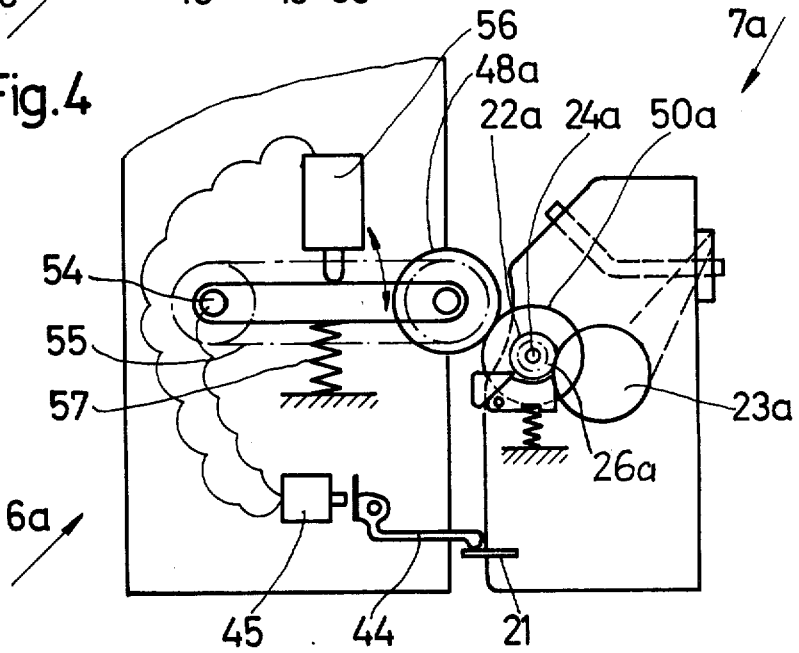
FIGS. 4 and 5 show further apparatuses with auxiliary drives for the sliver feed.

The embodiment shown in FIG. 4 corresponds primarily to the embodiment shown in FIG. 3. In this embodiment, a shaft 24a, extending through the machine in its longitudinal direction, is provided as the main drive for a feed roller 22a; shaft 24a is connected with feed roller 22a by means of a solenoid clutch 26a. Connected rigidly with feed roller 22a is a drive wheel 50a, to which is associated an auxiliary drive of a start-spinning unit 6a, which can travel along the spinning machine. The auxiliary drive has a driving wheel 48a, which is pivotally arranged about an axle 54 and which is driven by means of a toothed belt 55. Driving wheel 48a can be caused to mesh with drive wheel 50a against the effect of a spring 57 by means of a solenoid switch 56. Solenoid switch 56 is switched, in accordance with FIG. 3, by means of free arm 21 of a brake lever, an actuating lever 44 and a starting switch 45.

Figure 5:
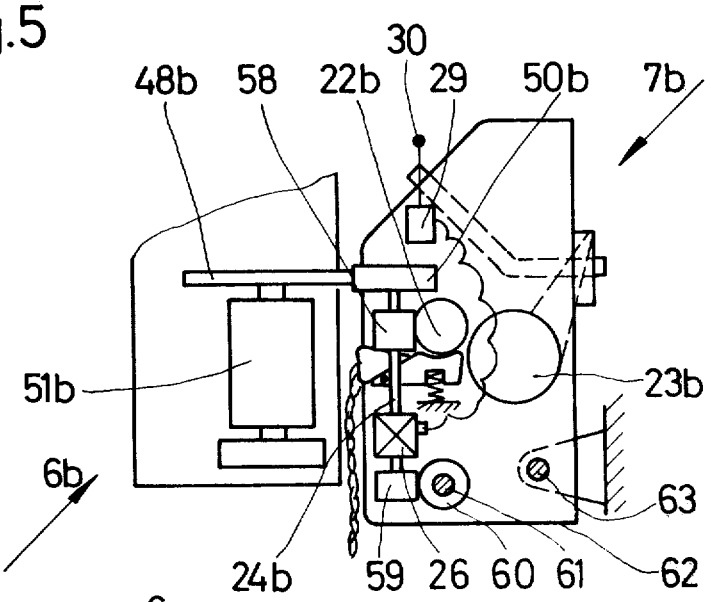

Shown in FIG. 5 is an embodiment in which feed rollers 22b of the individual spinning units 7b are driven by means of a shaft 61, extending through the machine longitudinally, by means of a standing shaft drive 24b. One end of standing shaft 24b has a helical gear 59, which meshes with a corresponding gear 60 of shaft 61. Also mounted on standing shaft 24b is a further helical gear 58, which meshes with a corresponding gear on feed roller 22b. The standing shaft is divided between helical gears 58 and 59 by means of a solenoid clutch 26. This solenoid clutch 26 is switched by a switch 29 of a thread stop-motion 30 in a similar manner to that in the embodiment according to FIG. 1. Standing shaft 24b extends beyond helical gear 58, and its free end has a drive wheel 50b, whose periphery protrudes beyond the enclosure of spinning unit 7b. Associated to this drive wheel 50b is a driving wheel 48b which belongs to an auxiliary drive, containing free-wheeling means 51b, of a mobile start-spinning unit 6b. In this embodiment also, in which that portion containing feed roller 22b and separating roller 23b can be swivelled away about an axle 63, the desired starting characteristic of the sliver feed can be realized by means of an auxiliary drive controlled by the start-spinning unit. It is ensured, in a manner corresponding to that of FIG. 3, that clutch 26 remains open during the start-spinning operation.

Figure 6:
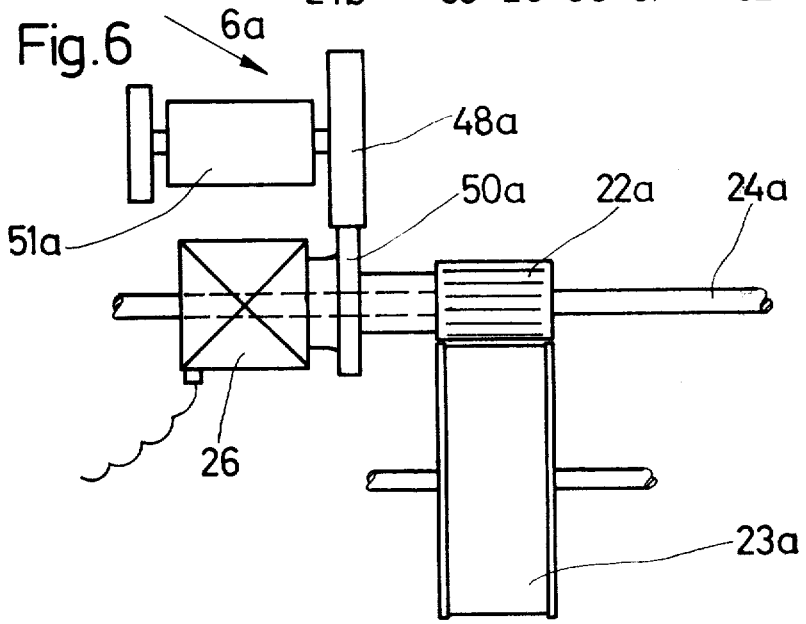
FIGS. 6 to 9 show further embodiments of the invention.

FIG. 6 shows an embodiment which is similar to that shown in FIG. 4 in which a feed roller 22a, which precedes a separating roller 23a, is arranged on a shaft 24a, extending through the machine in the longitudinal direction thereof, with the aid of a solenoid clutch 26. Feed roller 22a is rigidly connected with a drive wheel 50a, which belongs to an auxiliary drive of a start-spinning unit 6a, which contains freewheeling means 51a.

Figure 7:
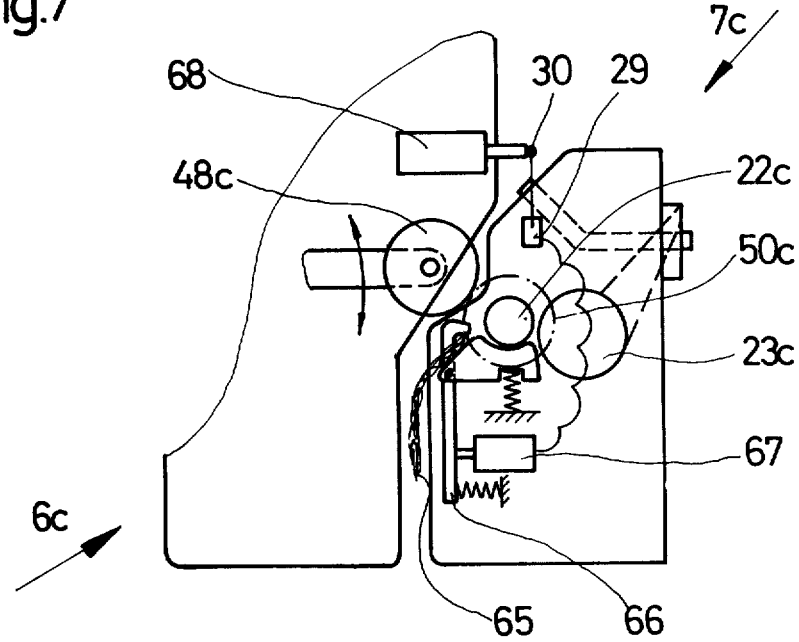
Figure 8:
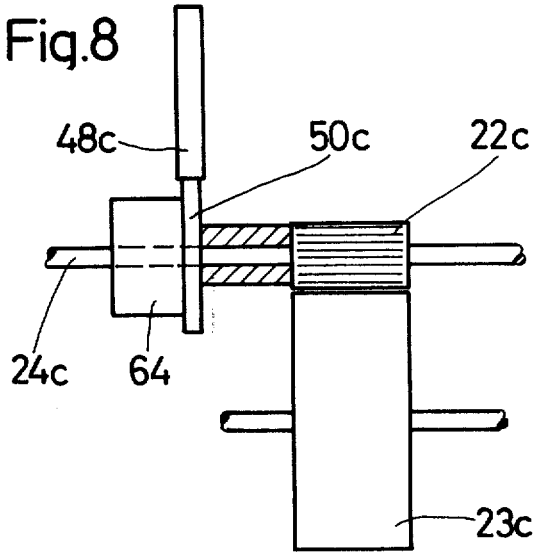

FIGS. 7 and 8 show an embodiment of the invention in which one feed roller 22c for each spinning point 7c is arranged on a drive shaft 24c, extending through the machine in the longitudinal direction thereof, with the aid of a slip clutch 64. Slip clutch 64 and feed roller 22c are rigidly connected with a drive wheel 50c, to which is associated a driving wheel 48c of an auxiliary drive of a start-spinning unit 6c, which travels along the spinning machine. This driving wheel 48c is pivotally arranged on an arm in such a manner that it can be meshed with drive wheel 50c. In this embodiment of the invention, the drive of feed roller 22c is not interrupted, even if there is a thread break. In this embodiment, the sliver feed is interrupted by trapping sliver 65 with a clamping lever 66, which traps the sliver against an undercasing lever which is associated to separating roller 23c. In this connection, it is possible for the undercasing lever to be able to be moved slightly out of the area of separating roller 23c against the effect of a spring. Trapping is performed by means of a solenoid switch 67, acting on clamping lever 66, said solenoid switch 67 being controlled by switch 29 of thread stop-motion 30. In this embodiment, there is an electrically controlled actuating member 68 in start-spinning unit 6c, which places thread stop-motion 30 in the operating position for start spinning, so that clamping lever 66 releases the sliver feed. In this case, driving wheel 48c drives drive wheel 50c, and thus feed roller 22c, with the desired starting characteristic, whereby the required slip is permitted in slip clutch 64. In this embodiment, driving wheel 48c acts as a sort of brake for the main drive in order to achieve the delayed starting characteristic. To achieve the same effect, drive wheel 50c or driving wheel 48c could also be designed as brake discs, for example, which are braked with metered braking force during the start-spinning operation by braking means in start-spinning unit 6.

It is also possible to do without delay of the drive of feed roller 22a and, instead, to switch the sliver feed on and off intermittently by intermittently actuating clamping lever 66, which also permits the desired starting characteristic to be realized. To accomplish this, electrical switching element 68 would have to perform intermittent control movements.

Figure 9:
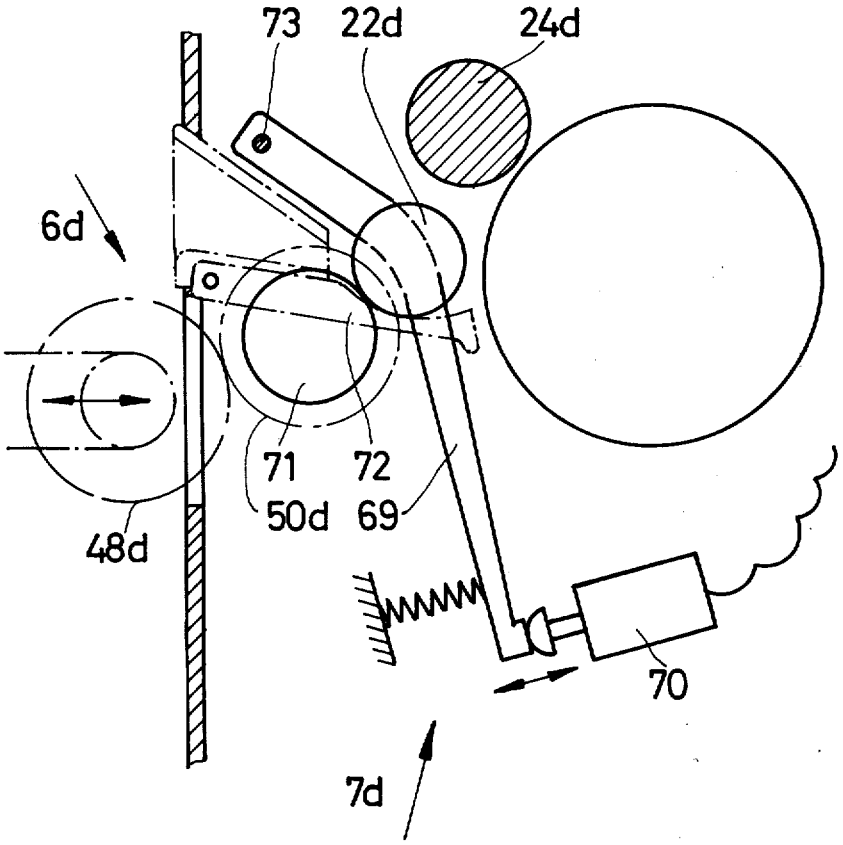

In the embodiment shown in FIG. 9, a feed roller 22d is mounted on a swivel lever 69 which can be pivoted about an axle 73 and which operates conjointly with an undercasing lever 72. The feed roller is pressed against a drive shaft 24d, extending through the machine, by means of spring force. To interrupt the sliver feed in this embodiment, swivel lever 69 is swivelled out, together with an electrical actuating element 70, which is also switched by a switch of a thread stop-motion, in such a manner that feed roller 22d lifts off drive shaft 24d. Arranged on the side of feed roller 22d which is opposite drive shaft 24d is a further roller 71, which is connected with a drive wheel 50d. A driving wheel 48d of an unillustrated, mobile start-spinning unit is associated to this drive wheel 50d. In this embodiment, also, feed roller 22d can be driven by an auxiliary drive of the start-spinning unit during the start-spinning operation, while the main drive of feed roller 22d remains switched off during this period.

Figure 10:
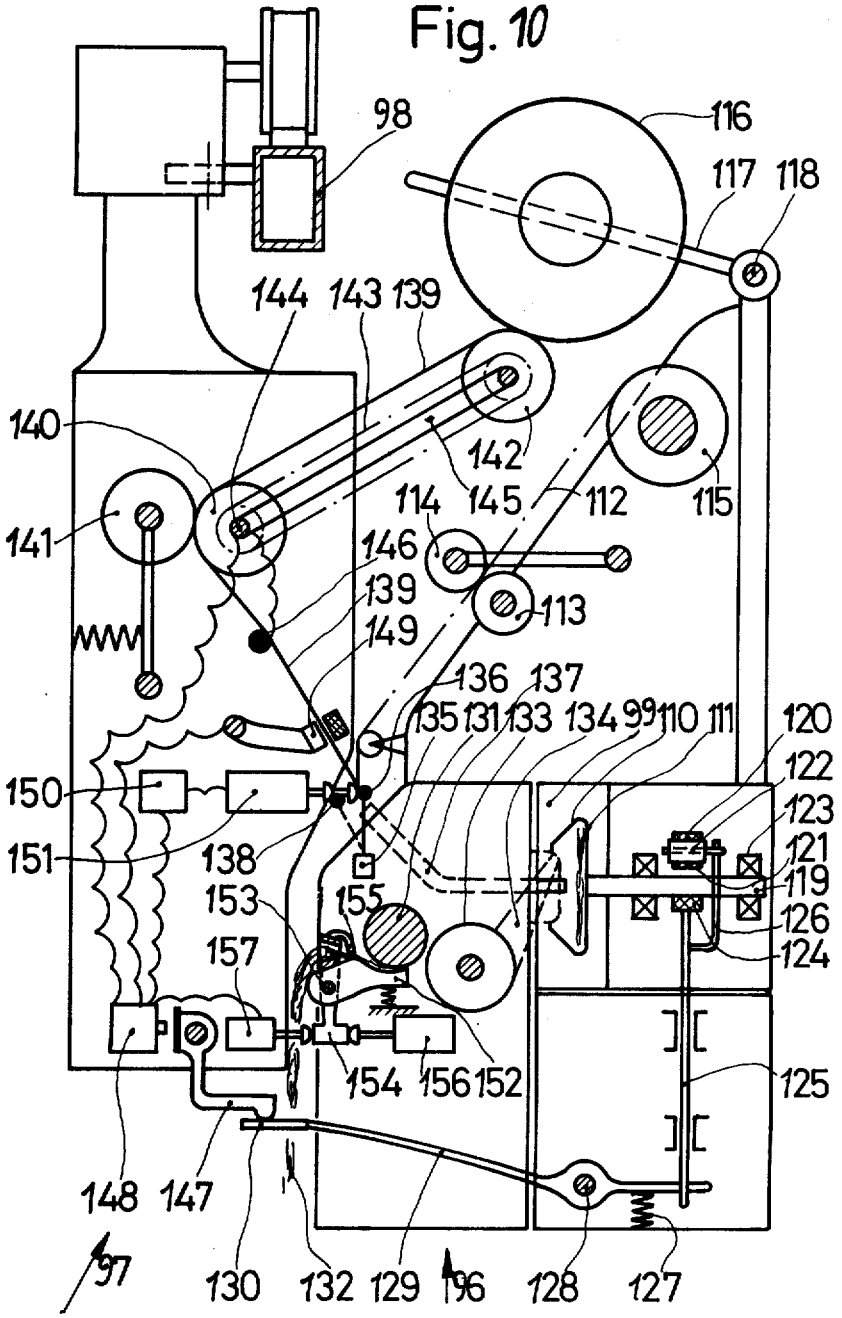
FIG. 10 shows an embodiment of the invention with switching means acting directly on a clamping lever controlling the sliver feed.

With the embodiment shown in FIG. 10, curve 5 in FIG. 2, especially, can be realized when the sliver feed is started. Shown in this FIG. 10 is a start-spinning unit 97, which travels along a spinning machine on a rail 98 and which is moved to a spinning unit 96 at which a start-spinning operation is to be performed. The spinning machine is equipped with a plurality of spinning units 96 of this type, arranged one beside the other. Each spinning unit 96 contains a spinning rotor 110, rotating in an underpressure chamber 99, whereby a ring 111 of separated fibres is deposited continually in spinning rotor 110 and is normally drawn off as the continuously spun yarn 112 represented by the dash-dotted line in FIG. 10. The yarn is drawn off by means of draw-off rollers 113 and 114 and a winding roller 115, which, in the operating condition, is in a contacting relationship with a winding cone 116 which is mounted on an arm 117, which can be pivoted about an axle 118.

Spinning rotor 110 is mounted in two bearings 123 by means of a shaft 119. It is driven by a tangential belt 120 121, whose lower track 121 is pressed against shaft 119 by a pressure roller 112 in the operating condition. To remedy a thread break, pressure roller 122 is lifted away from shaft 119 with lower track 121, while a brake lining 124 simultaneously presses against rotor shaft 119. This situation is represented in FIG. 10. Tangential belt 120, 121 is lifted off and brake lining 124 is applied by means of interconnected levers 125 and 126, which can be operated by means of a common actuating lever 129. The free end 130 of actuating lever 129, which can be pivoted about an axle 128 and is loaded in the direction of its operating position by means of a tension spring 127, protrudes from the front of spinning unit 96.

The ring 111 of separated fibres continuously deposited in spinning rotor 110 is provided by a sliver 132, which is supplied by a feed roller 131 operating conjointly with a trough 152, to a separating roller 133, rotating at a considerably higher speed, from where the separated fibres are supplied to spinning rotor 110 through a fibre feed channel 134. Feed roller 131 and separating roller 133 are driven by unillustrated drive means. In the event of the thread break, or if the spinning machine is switched off, the supplied sliver 132 is trapped with a clamping lever 154, whose nose 155 presses against sliver 132 and traps it on trough 152. This is to avoid clogging spinning rotor 110 and separating roller 133.

The trapping of sliver 132 is controlled by a thread stop-motion 136, which is arranged at the end of a yarn removal channel 137 and over which the spun yarn 112 is advanced. If the thread tension is reduced as a result of a thread break, thread stop-motion 136 assumes the position 138 represented by the dashed line. Actuating a switch 135 causes clamping lever 154 to be pressed to the left by means of a lifting magnet 156 coupled with said switch 135, whereby sliver 132 is trapped by nose 155 of clamping lever 154. This thus interrupts the feed of sliver 132.

It is the task of start-spinning unit 97, which travels along the spinning machine, to find the broken end 139 of the thread on cone 116 in the event of a thread break, and to return it to spinning rotor 110 for start-spinning. Start-spinning unit 97 contains a lift-off roller 142, with which cone 116 can be lifted off its winding roller 115. Lift-off roller 142 is also driven by the driven draw-off roller 140 of a pair of draw-off rollers 140, 141, by means of a toothed belt 143. Draw-off roller 140, and thus lift-off roller 142, can be driven in either sense of rotation. In the illustrated embodiment, lift-off roller 142 is mounted about a swivel arm 145, which can be pivoted about the shaft 144 of driven draw-off roller 140. The end 139 of the thread drawn off by start-spinning unit 97 is led over a thread tension feeler 146, which controls the reversal of the sense of rotation from feed to spinning rotor 110 to draw-off again. Start-spinning unit 97 further contains a rotatable thread trapper 149, which offers the end 139 of the yarn to be start-spun again to yarn removal channel 137, through which the end of the yarn is then sucked with the aid of an underpressure in rotor chamber 99 in order to be placed on the ring 111 of separated fibres.

Start-spinning unit 97 is switched on by means of actuating lever 147, which acts on a starting switch 148 equipped with a time-lag relay. This starting switch 148 is electrically coupled with a drive motor of draw-off roller 140, on the one hand, and with rotatable thread trapper 149 as well as with a switch 150, on the other. By means of a lifting magnet 151, switch 150 can move the thread stop-motion from its inoperable position 138 to the right in FIG. 10, beyond its operating position 136.

Start-spinning unit 97 operates in the following manner: The initial position is illustrated in FIG. 10, i.e. rotor shaft 119 is braked, actuating lever 147 rests on the outer end 130 of double lever 129, threaded trapper 149 holds thread 139 to be start spun in the illustrated position, driven rollers 140 and 142 are stopped, and yarn winding cone 116 is in a contacting relationship with lift-off roller 142 and thus no direct contact with spinning unit 96.

After the brake is released, the outer end 130 of double lever 129 moves upward under the effect of tension spring 127. This lowers actuating lever 125 of brake 124 and the lift-off means for pressure roller 122, on the one hand, i.e. tangential belt 121 presses against rotor shaft 119, thereby driving spinning rotor 110. On the other hand, actuating lever 147 of start-spinning unit 97 is lifted, thereby actuating starting switch 148. By means of a time-lag relay or similar means connected with said switch 148, both draw-off roller 140 and lift-off roller 142 are driven in such a manner, with simultaneous opening of thread trapper 149, that thread 139 to be start spun is introduced into yarn removal channel 137 and further into spinning rotor 110. By means of switch 150, lifting magnet 151 presses thread stop-motion 138 into position 136, i.e. to the right of its operating position, which causes clamping means 154, 155 to not release sliver 132 for the moment. This is important, as can be seen by the following. Starting switch 148 also actuates a connected changeover switch 157, which is designed as a solenoid switch and which alternately presses clamping means 154 to the right against the resistance of lifting magnet 156 and release it again at preselected times and intervals. This causes nose 155 of clamping element 154 to lift off sliver 132 intermittently, thereby alternately starting and stopping the feed, as feed roller 131 was not switched off and thus constantly rotates. This entire sequence must have occurred before spinning rotor 110 has achieved its operating speed. At a given, predetermined tension of thread 139, which has now been start spun, thread tension feeler 146 causes rollers 140 and 142 to reverse direction, which concludes the actual start-spinning operation. Winding roller 116 and thread 139 must then still be returned to spinning unit 96 by unillustrated means.

Since lifting magnet 156 must constantly press clamping lever 154 to the left when switching means 157 switch intermittently, it can be seen that thread stop-motion 136 must not switch off lifting magnet 156 for the time being. This is the reason why lifting magnet 151 pressed thread stop-motion 136 to the right of its operating position. After the start-spinning operation has been completed, lifting magnet 151 releases the thread stop-motion, so that said thread stop-motion can assume its operating position 136, whereby lifting magnet 156 is switched off and sliver 132 is thereby released again through the effect of an unillustrated spring of clamping lever 154, 155.

Through the present invention, the sluggishness of switch 135, and thus the coupling with lifting magnet 156, no longer makes any difference, as clamping lever 154 is acted upon directly through intermittent reciprocating-piston switch 157.

Obviously, many modifications and variations of the present invention are possible in the light of the above teachings. It should therefore be understood that within the scope of the appended claims, the invention may be practiced otherwise than as specifically described.

Having thus fully disclosed our invention, what we claim is:

[1. A method for start-spinning a thread on open-end spinning units of an open-end spinning machine, in which an end of the thread is returned to a spinning rotor, placed on a ring of fibres deposited in said spinning rotor and then drawn off again, whereby during said placing of said end of the thread on said ring of fibres, the speed of said spinning rotor is reduced relative to its operating speed and whereby a mobile start-spinning unit intervenes in the drive and/or control of means providing the sliver feed and thus controlling the volume of said ring of fibres deposited in said spinning rotor, wherein said thread is returned to said spinning rotor and placed on said ring of fibres during acceleration of said spinning rotor from a previously braked condition to its operating speed.]

[2. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in one of drive means and control means providing the feed of the sliver forming said fibre ring for the purpose of reducing the rate of said formation of said fibre ring, wherein a common mechanical drive means is provided for rotatably driving spinning rotors of a plurality of said spinning units, and wherein said means which intervene include means for interrupting the rotatable drive of one of said spinning rotors without interrupting the rotatable drive of the other of said commonly driven spinning rotors.]

[3. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in one of drive means and control means providing the feed of the sliver forming said fibre ring for the purpose of reducing the rate of said formation of said fibre ring, wherein said means for placing said end of the thread and said means for reducing the speed of said spinning rotor relative to its operating speed are constructed and synchronized such that said thread is returned to said spinning rotor and placed on said ring of fibres during acceleration of said spinning rotor from a previously braked condition to its operating speed.]

4. An apparatus for start-spinning a thread on an open-end spinning unit of an openend spinning machine, having amobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in drive means providing the feed of the sliver forming said fibre ring for the purpose of reducing the rate of said formation of said fibre ring, in which said start-spinning unit contains a driving wheel which, through adjustment, can be coupled with a corresponding drive wheel of the drive means associated to the open-end spinning unit for the feed of said sliver.

5. The apparatus according to claim 4, in which said drive wheel is arranged on a standing shaft which drives a feed roller for feeding the sliver by means of helical gears.

6. An apparatus for start-spinning a thread on an open-end spinning unit of an openend spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in drive means providing the feed of the sliver forming said fibre ring for the purpose of reducing the rate of said formation of said fibre ring, in which an auxiliary drive of the start-spinning unit has freewheeling means.

7. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in control means providing the feed of the sliver forming said fibre ring for the purpose of reducing the rate of said formation of said fibre ring, in which, through transmission means of the start-spinning unit, a thread stop-motion connected with a reversing switch is caused to interrupt a stationary drive for feeding the sliver.

8. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in drive means providing the feed of the sliver forming said fibre ring for the purpose of reducing the rate of said formation of said fibre ring, in which the sliver is fed by means of a feed roller, which, under normal operating conditions, is pressed against a drive shaft extending over a plurality of spinning units and which, in the event of a thread break, is lifted off the drive shaft by an actuating element which is electrically connected with a thread stop-motion, and is pressed against a roller which is driven by a driving wheel of the start-spinning unit.

9. The apparatus according to claim 8, in which said feed roller is associated to a trough which traps the sliver, said trough performing the swivel movement of the feed roller.

[10. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in control means providing the feed of the sliver forming said fibre ring for the purpose of reducing the rate of said formation of said fibre ring, in which the start-spinning unit contains intermittently operating switching means which can be connected with the switching means of a clutch which is associated to the sliver feed and which can be switched on and off.]

11. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in control means providing the feed of the sliver forming said fibre ring for the purpose of reducing the rate of said formation of said fibre ring, in which said start-spinning unit contains switching means which can be coupled to trapping means, associated to each spinning unit, for interrupting the sliver feed, said switching means permitting said trapping means to be switched either on or alternatively on and off at predetermined time.

12. An apparatus for start-spinning a thread on an open-end spinning unit of an open-end spinning machine, having a mobile start-spinning unit with means for returning an end of the thread to a spinning rotor, for placing said end of the thread on a ring or fibres located in said spinning rotor and for drawing off the start-spun thread again, as well as means for reducing the speed of said spinning rotor relative to its operating speed, and means which intervene in drive means providing the feed of the sliver forming said fibre ring for the purpose of reducing the rate of said formation of said fibre ring, in which said start-spinning unit contains an auxiliary brake which can be coupled with the means for feeding the sliver.

13. The apparatus according to claim 12, in which a known feed roller is provided for feeding the sliver, said roller being able to be coupled with said auxiliary brake by means of a slip clutch arranged on a shaft extending over a plurality of spinning units and by means of a gear.

14. An apparatus for start-spinning a thread on an open-end spinning unit of an open-end spinning machine, having a mobile start-spinning unit with means for returning an end of the thread to a spinning rotor, for placing said end of the thread on a ring of fibres located in said spinning rotor and for drawing off the start-spun thread again, as well as means for reducing the speed of said spinning rotor relative to its operating speed, and means which intervene in control means providing the feed of the sliver forming said fibre ring for the purpose of reducing the rate of said formation of said fibre ring, in which said start-spinning unit contains intermittently operating switching means which intervene directly from the outside in trapping means which interrupt the sliver feed and which intermittently interrupt said trapping effect.

15. The apparatus according to claim 14, in which each open-end spinning unit is equipped with a thread tension feeler controlling the actuation of the trapping means, whereby adjusting means of the start-spinning unit are associated to said feeler, said adjusting means placing said feeler, during the start-spinning operation, in a position extending beyond the operating position, in which said trapping means remain switched on.

16. The apparatus according to claim 15, in which each open-end spinning unit contains a clamping lever which traps the sliver in a trough, which can be loaded in the clamping direction with an adjusting member, opposite which an adjusting member of the start-spinning unit is arranged on the clamping lever and aligned oppositely, said latter adjusting member being dimensioned significantly stronger.

[17. A method for start-spinning a thread on an open-end spinning unit of an open-end spinning machine, comprising:

reducing the speed of a spinning rotor of said spinning unit to a speed below its operational spinning speed, intervening in at least one of the drive and control of sliver feed means of said spinning unit so as to control the volume of fibres deposited by said sliver feed in said spinning rotor, placing an end of a thread piece on a ring of fibres deposited in said spinning rotor and drawing said thread piece out of said spinning rotor upon connection of said end with said fibres, and controlling the speed of said rotor and the timing of said intervening step such that the rotor is accelerating toward said operational spinning speed during said placing step.]

18. A method [according to claim 17,] *for start-spinning a thread on an open-end spinning unit of an open-end spinning machine, comprising:*

*reducing the speed of a spinning rotor of said spinning unit to a speed below its operational spinning speed,*

*intervening in at least one of the drive and control of sliver feed means of said spinning unit so as to control the volume of fibres deposited by said sliver feed in said spinning rotor,*

*placing an end of a thread piece on a ring of fibres deposited in said spinning rotor and drawing said thread piece out of said spinning rotor upon connection of said end with said fibres,*

*and controlling the speed of said rotor and the timing of said intervening step such that the rotor is accelerating toward said operational spinning speed during said placing step,* wherein said step of controlling the speed of said rotor and the timing of said intervening step includes rotatably driving said rotor by auxiliary driving means that are separate from main drive means that normally drive said rotor at its operational spinning speed.

19. A method according to claim 18, wherein said spinning unit is one of a plurality of spinning units having respective spinning rotors driven by a common main drive means, and wherein said controlling the speed of said rotor and the timing of said intervening step includes interrupting the drive connection between said main drive means and one of said spinning rotors without interrupting the drive connection of other of said spinning rotors and said main drive means.

[20. An apparatus for start-spinning a thread on an open-end spinning unit of an open-end spinning machine, said apparatus comprising:

reducing means for reducing the speed of a spinning rotor of said spinning unit to a speed below its operational spinning speed, intervening means for intervening in at least one of the drive and control of sliver feed means of said spinning unit so as to control the volume of fibres deposited by said sliver feed in said spinning rotor, placing means for placing an end of a thread piece on a ring of fibres deposited in said spinning rotor and drawing said thread piece out of said spinning rotor upon connection of said end with said fibres, and controlling means for controlling the speed of said rotor and the timing of said intervening step such that the rotor is accelerating toward said operational spinning speed during said placing by said placing means.]

21. [An apparatus according to claim 20,] *An apparatus for start-spinning a thread on an open-end spinning unit of an open-end spinning machine, said apparatus comprising:*

*reducing means for reducing the speed of a spinning rotor of said spinning unit to a speed below its operational spinning speed,*

*intervening means for intervening in at least one of the drive and control of sliver feed means of said spinning unit so as to control the volume of fibres deposited by said sliver feed in said spinning rotor,*

*placing means for placing an end of a thread piece on a ring of fibres deposited in said spinning rotor drawing said thread piece out of said spinning rotor upon connection of said end with said fibres,*

*and controlling means for controlling the speed of said rotor and the timing of said intervening step such that the rotor is accelerating toward said operational spinning speed during said placing by said placing means,* wherein said control means includes means for rotatably driving said rotor by auxiliary driving means that are separate from main drive means that normally drive said rotor at its operational spinning speed.

[22. Apparatus according to claim 20, wherein said spinning unit is one of a plurality of spinning units having respective spinning rotors driven by a common main drive means, and wherein said control means includes means for interrupting the drive connection between said main drive means and one of said spinning rotors without interrupting the drive connection of other of said spinning rotors and said main drive means.]

[23. Apparatus according to claim 20, wherein said reducing means, intervening means, placing means, and controlling means are carried on a mobile unit which is mounted for movement along a plurality of spinning units.]

* * * * *